(12) United States Patent
Tang et al.

(10) Patent No.: US 10,120,512 B2
(45) Date of Patent: Nov. 6, 2018

(54) HOVER SENSOR

(71) Applicant: Microsoft Technology Licensing, LLC, Redmond, WA (US)

(72) Inventors: Yingying Tang, Wilsonville, OR (US); Tianzhu Qiao, Portland, OR (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 203 days.

(21) Appl. No.: 15/094,794

(22) Filed: Apr. 8, 2016

(65) Prior Publication Data

US 2017/0293376 A1    Oct. 12, 2017

(51) Int. Cl.
*G06F 3/044* (2006.01)
*G06F 3/041* (2006.01)

(52) U.S. Cl.
CPC ............ *G06F 3/044* (2013.01); *G06F 3/0418* (2013.01); *G06F 2203/04101* (2013.01)

(58) Field of Classification Search
CPC ................... G06F 3/0418; G06F 3/044; G06F 2203/04101
See application file for complete search history.

(56) References Cited

U.S. PATENT DOCUMENTS

| | | | |
|---|---|---|---|
| 7,292,229 B2 | 11/2007 | Morag et al. | |
| 8,982,060 B2 | 3/2015 | King et al. | |
| 9,195,353 B2 | 11/2015 | Byun et al. | |
| 9,223,442 B2 | 12/2015 | Hoffman | |
| 2007/0176609 A1 | 8/2007 | Ely et al. | |
| 2010/0079401 A1 | 4/2010 | Staton | |
| 2011/0007021 A1 | 1/2011 | Bernstein et al. | |
| 2012/0050180 A1* | 3/2012 | King | G06F 3/0416 345/173 |
| 2012/0306802 A1 | 12/2012 | McCracken | |

(Continued)

OTHER PUBLICATIONS

Li, et al., "A New Differential Measurement Scheme for Projected-Capacitive Touch Controller", In Proceedings of IEEE 9th Conference on Industrial Electronics and Applications, Jun. 9, 2014, pp. 872-876.

(Continued)

*Primary Examiner* — Stacy Khoo
(74) *Attorney, Agent, or Firm* — Alleman Hall Creasman & Tuttle LLP

(57) ABSTRACT

Examples are disclosed herein that relate to hover sensing. One example provides a hover sensor comprising an electrode array including a first electrode subset and a second electrode subset, each electrode in the first electrode subset coupled to a corresponding electrode in the second electrode subset at a respective node and separated from the corresponding electrode by a gap, a charge circuit configured to charge the first electrode subset substantially oppositely about a reference voltage to the second electrode subset, an integration circuit configured to, for each respective node, store a net charge on a capacitor and provide an output voltage based on the net charge stored on the capacitor, and a controller. The controller is configured to indicate a presence of a hover object responsive to identifying at least a threshold voltage change based on a sample of the output voltage.

20 Claims, 11 Drawing Sheets

(56) References Cited

U.S. PATENT DOCUMENTS

| | | | |
|---|---|---|---|
| 2013/0016062 A1* | 1/2013 | Nihei | G06F 3/0416 |
| | | | 345/174 |
| 2014/0085246 A1 | 3/2014 | Shahparnia | |
| 2014/0118289 A1 | 5/2014 | Lipasti et al. | |
| 2014/0306923 A1 | 10/2014 | Brillant et al. | |
| 2015/0029141 A1* | 1/2015 | Jo | G06F 3/044 |
| | | | 345/174 |
| 2015/0035787 A1 | 2/2015 | Shahparnia et al. | |
| 2015/0049043 A1 | 2/2015 | Yousefpor | |
| 2015/0049056 A1 | 2/2015 | Post et al. | |
| 2015/0220209 A1 | 8/2015 | Nys et al. | |
| 2015/0324116 A1* | 11/2015 | Marsden | H03K 17/9622 |
| | | | 345/158 |

OTHER PUBLICATIONS

Juchmes, Christi, "Introducing Hover Technology to Embedded Applications", Published on: Sep. 10, 2012 Available at: http://embedded-computing.com/articles/introducing-hover-technology-embedded-applications/.

Juchmes, Christi, "Beyond Touch: Introducing Advanced UI Features", Published on: Sep. 2011 Available at: http://www.cypress.com/file/109161/download.

ISA European Patent Office, International Search Report and Written Opinion Issued in PCT Application No. PCT/US2017/025224, dated Jun. 16, 2017, WIPO, 11 Pages.

\* cited by examiner

HOVER SENSOR

BACKGROUND

Hover sensors enable the sensing of objects hovering above a sensing surface. A hover sensor may indicate the presence of a human hand, for example, which may be relayed to a computing device as user input. In capacitive hover sensors, however, the signal-to-noise ratio of hover sensing may be degraded by parasitic capacitance among electrodes and other electronics.

SUMMARY

Embodiments of hover sensors and hover sensing methods are disclosed herein. According to a first aspect, a hover sensor is disclosed that includes an electrode array including a first electrode subset and a second electrode subset, each electrode in the first electrode subset coupled to a corresponding electrode in the second electrode subset at a respective node and separated from the corresponding electrode by a gap substantially corresponding to at least a human hand size range, a charge circuit configured to charge the first electrode subset substantially oppositely about a reference voltage to the second electrode subset, an integration circuit configured to, for each respective node, store a net charge on a capacitor and provide an output voltage based on the net charge stored on the capacitor, and a controller. The controller is configured to indicate a presence of a hover object responsive to identifying at least a threshold voltage change based on a sample of the output voltage.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Figure 1:
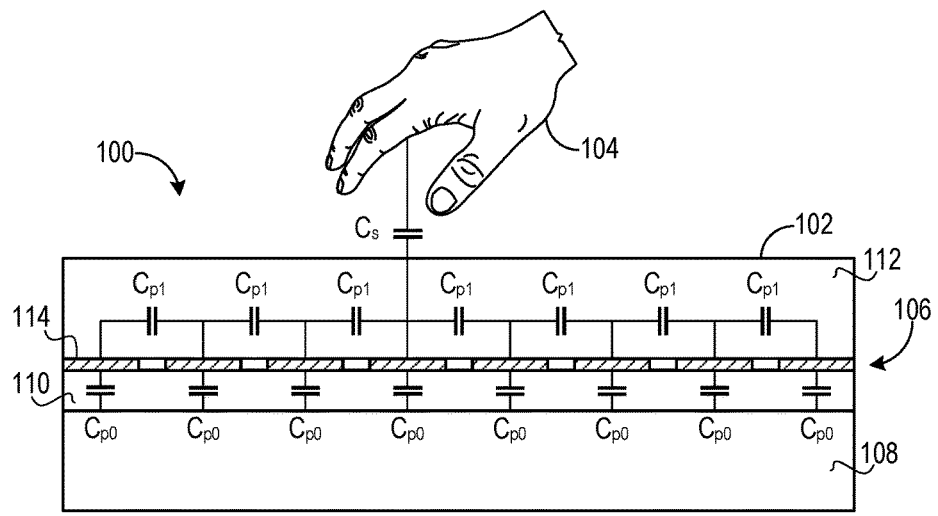
FIG. 1 shows an example hover-sensitive display.

FIG. 1 shows an example hover-sensitive display 100. Display 100 may be operable to receive hover input from objects hovering above a surface 102 of the display, such as a human hand 104. To this end, display 100 may include a hover sensor, which is generally indicated at 106 in FIG. 1. Display 100 may be further operable to output graphical content, which in some cases may be generated in response to the reception of hover input. To this end, display 100 may include a display device 108, which may be a liquid-crystal display (LCD) or organic light-emitting diode (OLED) display, for example. Further, display 100 may include an optically clear adhesive (OCA) 110 to bond display device 108 to hover sensor 106, and a cover layer 112 (e.g., glass) positioned above the hover sensor.

To enable the reception of hover input, hover sensor 106 may include an electrode array comprising a plurality of electrodes such as electrode 114. A capacitive sensing approach may be employed in which electrodes 114 are charged, and the charge accumulated on the electrodes over a period of time is used to indicate the presence of an object hovering above surface 102 of hover-sensitive display 100. While such an approach may facilitate the sensing of human hand 104 and other objects hovering within a range of distances from surface 102, the signal-to-noise ratio (SNR) of output from hover sensor 106 may be significantly degraded by parasitic capacitance, reducing hover sensing accuracy.

FIG. 1 schematically depicts a variety of parasitic capacitors that may form during operation of hover-sensitive display 100. In particular, parasitic capacitors $C_{p0}$ may form between each electrode 114 and a conductive element (e.g., ground plane) of display device 108. Parasitic capacitors $C_{p1}$ may also form among adjacent electrodes 114. While $C_{p0}$ may frequently dominate in the total parasitic capacitance, both types of parasitic capacitors may increase the difficulty of resolving a signal capacitance $C_s$ formed between electrodes 114 and human hand 104, as both the charge stored by these parasitic capacitors and the charge resulting from the presence of the human hand may combine to form a cumulative charge fed to a circuit that identifies the presence of hover objects. The presence of the parasitic charge may introduce a significant offset in the output voltage of this circuit, for example.

A variety of approaches have been developed for reducing the parasitic capacitance in hover-sensitive displays such as hover-sensitive display 100. For example, the distance between electrodes 114 in hover sensor 106 and display device 108 may be increased—e.g., by increasing the thickness of OCA 110. While a decrease in $C_{p0}$ may result, increasing OCA thickness may increase the cost of display 100, however. Another approach to reducing parasitic capacitance may include increasing the spacing among adjacent electrodes 114, which may decrease $C_{p1}$. Relatively sparse electrode layouts, however, may significantly degrade the signal capacitance $C_s$ between human hand 104 and electrodes 114 and therefore the sensitivity of hover sensing. Yet another approach may include shielding display device 108 with a guard electrode, and driving the guard electrode and electrodes 114 of hover sensor 106 with the same voltage. The addition of the guard electrode, however, may increase the cost and power consumption of display 100, particularly as the size of display device 108 increases.

Further, current used to drive the guard electrode may couple into display device 108, which could distort imagery produced by the display device, and in some cases, degrade the display device itself.

Figure 2:
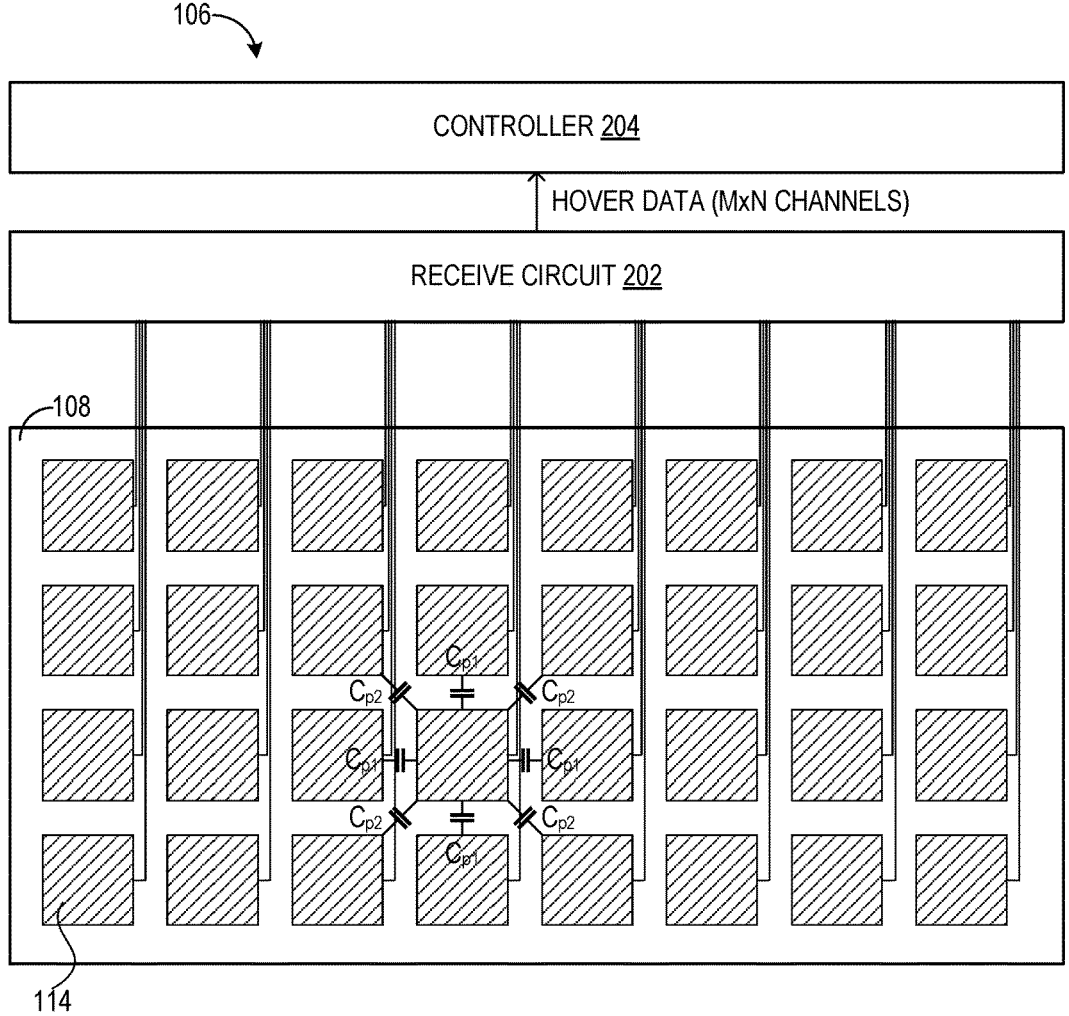
FIG. 2 schematically shows a hover sensor of the hover sensitive display of FIG. 1 in detail.

Turning now to FIG. 2, hover sensor 106 of hover-sensitive display 100 is schematically shown in detail. As described above, hover sensor 106 may include a plurality of electrodes 114 that, in the depicted example, are arranged in a rectangular M×N array. FIG. 2 illustrates the parasitic capacitors that may form among electrodes 114, including parasitic capacitors $C_{p1}$ formed between electrodes spaced one row or column apart, and parasitic capacitors $C_{p2}$ formed between diagonally adjacent electrodes. If all electrodes 114 are driven with a common voltage, substantially no charge may be stored in either type of parasitic capacitor. However, the parasitic capacitance (e.g., $C_{p0}$) between electrodes 114 and display device 108 may remain.

Each electrode 114 may be coupled to a receive circuit 202 that is generally configured to receive charges accumulated on each electrode and to produce output based on the received charges (e.g., a digitally sampled voltage) that can be fed to a controller 204 in the form of hover data. As shown in FIG. 2, respective hover data may be collected and provided to controller 204 for each electrode 114 through corresponding M×N channels, which may enable granular hover sensing. Controller 204 may perform any suitable action based on received hover data. For example, in response to identifying the presence of a hover object, controller 204 may change a user interface mode, generate a user login prompt, and/or permit/deny data access. In some implementations, hover sensor 106 may be used to receive three-dimensional hand gestures, which controller 204 may interpret and carry out corresponding functions in response.

Figure 3:
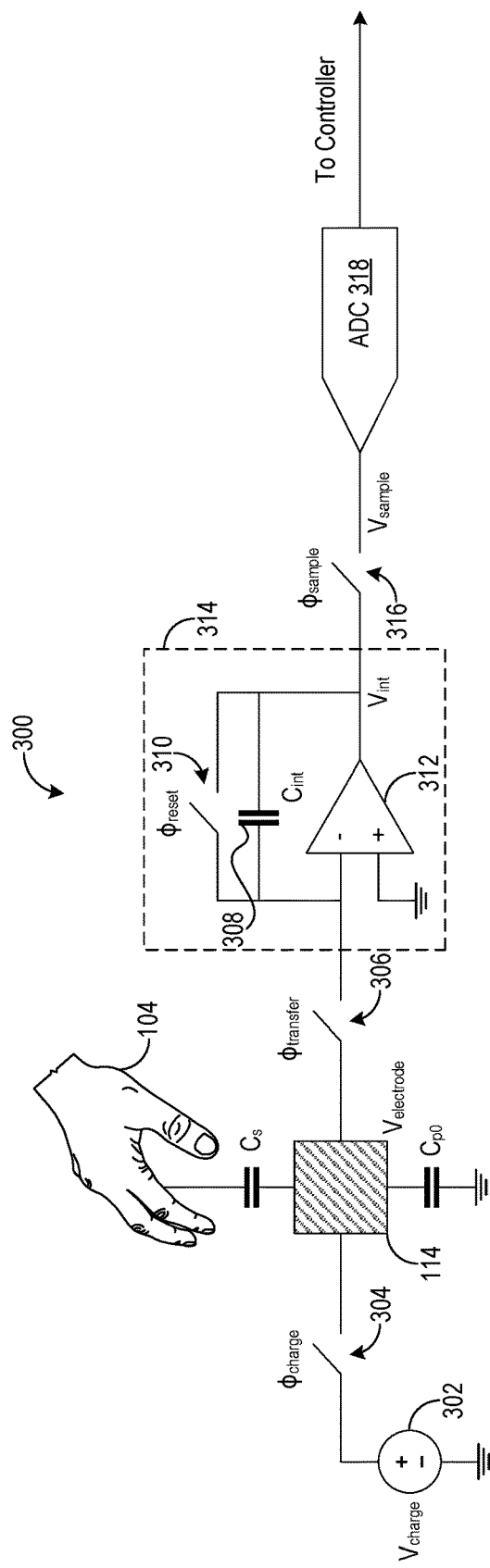
FIG. 3 schematically shows an example hover sensing circuit.

Turning now to FIG. 3, an example hover sensing circuit 300 is schematically shown. Circuit 300 is shown in connection with a single electrode 114 in hover sensor 106 (FIG. 1), though analogous circuits may be provided for each electrode in the hover sensor. One or more of the elements of circuit 300 may be shared among two or more electrodes, however. Circuit 300 may include a voltage source 302 for providing a fixed voltage $V_{charge}$ to electrode 114, and a charge switch 304 for selectively coupling the voltage source to the electrode. FIG. 3 shows a signal capacitance $C_s$ that may form between human hand 104 and electrode 114, and a parasitic capacitance $C_{p0}$ that may form between a display device (e.g., display device 108 of FIG. 1) and the electrode. Circuit 300 may further include a transfer switch 306 for selectively transferring the charge accumulated on electrode 114—e.g., as a result of coupling to voltage source 302—to an integration capacitor 308.

A reset switch 310 and an operational amplifier 312 may both be placed in parallel with integration capacitor 308, which may be collectively referred to as an integration circuit 314. Reset switch 310 may be operable to selectively discharge integration capacitor 308, and may be closed to discharge the capacitor after a desired number of integration periods such that a cumulative charge may be stored on the capacitor that is a sum of the charges stored on the capacitor after each integration period. A sample switch 316 may be operable to selectively couple an output voltage Vint of integration circuit 314 to an input of an analog-to-digital converter (ADC) 318 (e.g., thereby generating a voltage Vsample), which may be configured to sample the output voltage by digitally sampling the voltage Vsample at its input. ADC 318 may report the digital sample of the output voltage Vint to a controller. The controller may interpret the digital sample of the output voltage Vint to identify the presence of human hand 104, for example.

Figure 4:
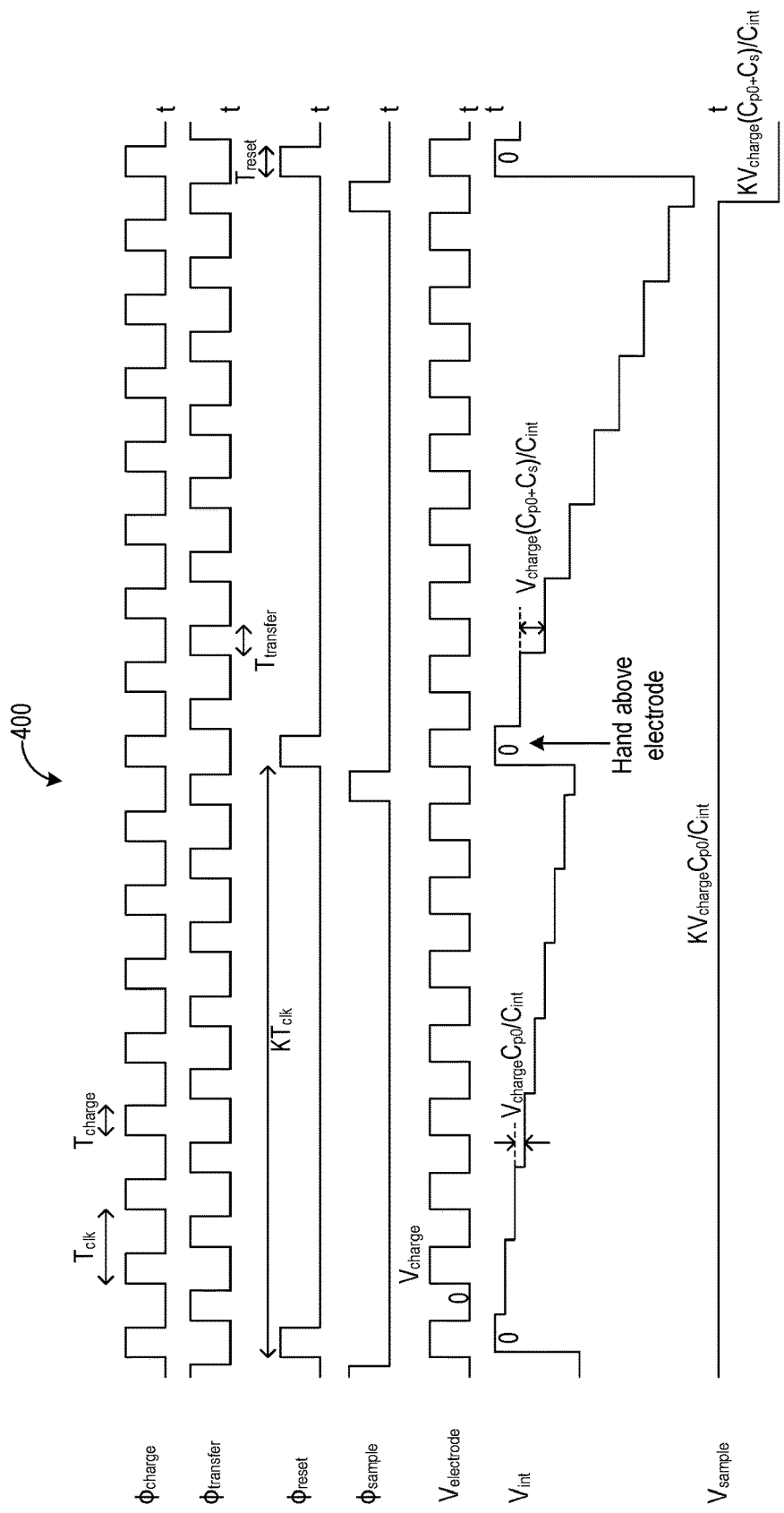
FIG. 4 shows a timing diagram of various operating parameters of the hover sensing circuit of FIG. 3.

FIG. 4 shows a timing diagram 400 of various operating parameters of hover sensing circuit 300. As such, references to FIG. 3 are made hereinafter. In particular, FIG. 4 illustrates clock signals that may be used to actuate charge switch 304, transfer switch 306, reset switch 310, and sample switch 316, all as a function of time. The clock signals may also represent the current and/or voltage through their corresponding switches as a function of time. FIG. 4 additionally illustrates, as a function of time, the voltage $V_{electrode}$ on electrode 114, the output voltage $V_{int}$ of integration circuit 314, and the voltage $V_{sample}$ at the input of ADC 318.

As shown in FIG. 4, during a charge period $T_{charge}$, electrode 114 may be coupled to voltage source 302 and charged to $V_{charge}$. Consequently, a charge of $V_{charge}C_{p0}$ (if human hand 104 is not present) or a charge of $V_{charge}(C_{p0}+C_s)$ (if the human hand is present) may be stored on electrode 114 via its self-capacitance. Charge may thus be stored via parasitic capacitor $C_{p0}$ even if, as described above, substantially no charge is stored via parasitic capacitors $C_{p1}$ and $C_{p2}$ (both of FIG. 2) formed with adjacent electrodes as a result of all electrodes being driven with $V_{charge}$. During a transfer period $T_{transfer}$, the charge stored on electrode 114 may be transferred to integration capacitor 308, and $V_{electrode}$ may return to zero. Accordingly, the output voltage $V_{int}$ of integration circuit 314 may decrease by either $V_{charge}C_{p0}/C_{int}$ or $V_{charge}(C_{p0}+C_s)/C_{int}$, depending on whether human hand 104 is present. This process may be repeated for K number of integration periods such that a cumulative charge is formed on integration capacitor 308 that is a sum of the charges stored on the integration capacitor for each integration period. After the K number of integration periods, ADC 318 may sample the output voltage $V_{int}$ of integration circuit 314 by digitally sampling the voltage $V_{sample}$ (e.g., the voltage at the downstream side of sample switch 316) at its input. ADC 318 may report the digital sample of the output voltage $V_{int}$ to a controller. The controller may indicate the presence of human hand 104 responsive to identifying at least a threshold voltage change based on the digital sample of the output voltage $V_{int}$—e.g., the change in $V_{sample}$ from $KV_{charge}C_{p0}/C_{int}$ to $KV_{charge}(C_{p0}+C_s)/C_{int}$. Integration capacitor 308 may be discharged to zero during a reset period $T_{reset}$.

When operating hover sensing circuit 300 in accordance with timing diagram 400, it may be desired to select the capacitance of integration capacitor 308 to be large enough to avoid saturation of operational amplifier 312 due to the relatively large parasitic capacitance $C_{p0}$. However, such selection may render the resolution of the relative small signal capacitance $C_s$ difficult. Further, the relatively large ratio of the parasitic capacitance to the signal capacitance $C_{p0}/C_s$ may arise in hover sensing circuits other than circuit 300 and/or in operating schemes other than that represented by timing diagram 400. Thus, a prohibitively large dynamic range of capacitance readout circuitry may be called for without a scheme for calibrating parasitic capacitance.

To address the issues identified above, implementations are described herein for hover sensing in which parasitic capacitance is calibrated for and mitigated.

Figure 5:
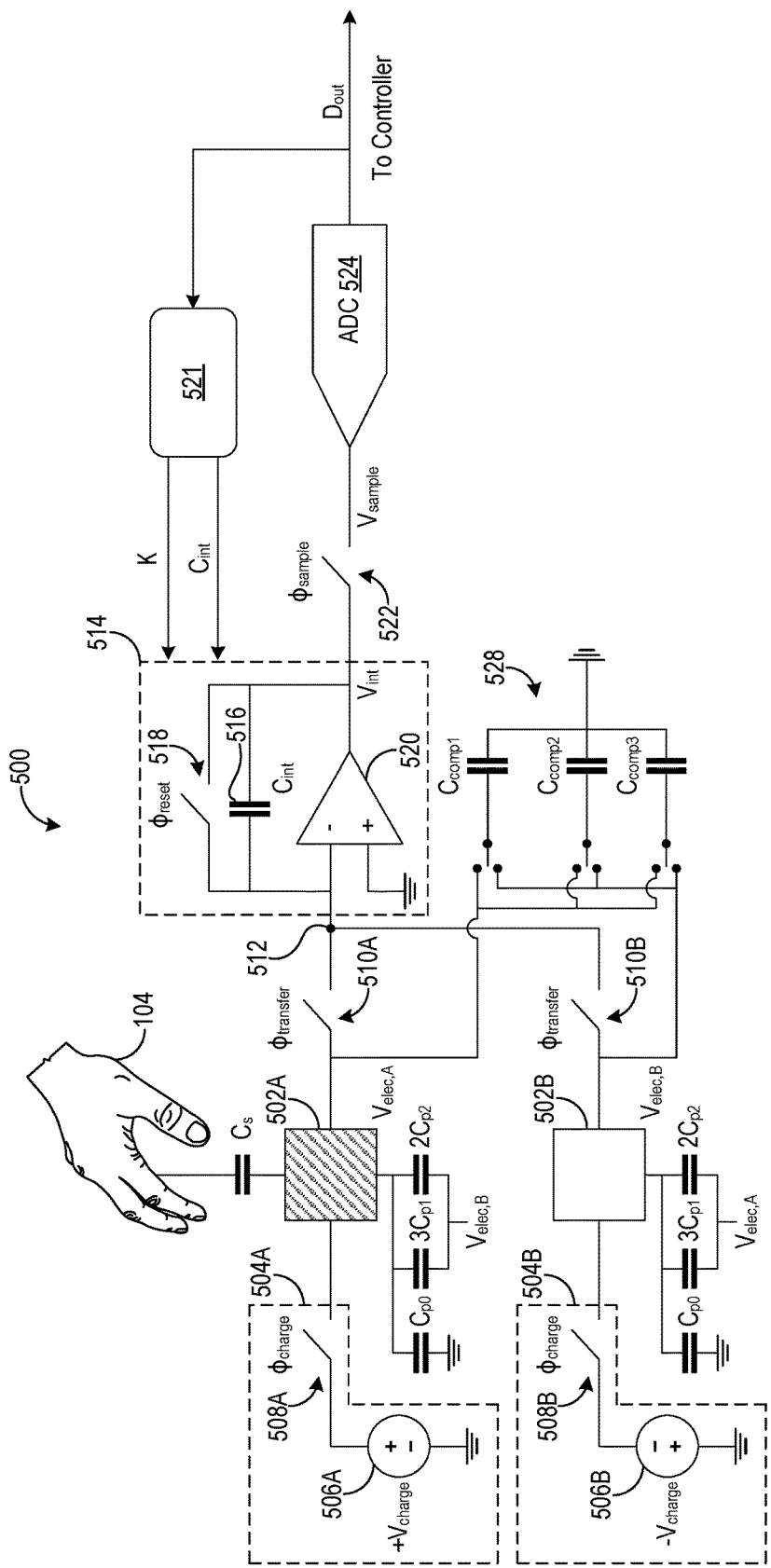
FIG. 5 schematically shows another example hover sensing circuit.

Turning now to FIG. 5, an example hover sensing circuit 500 is schematically shown. Circuit 500 is shown in connection with a pair of electrodes 502A and 502B, which may be charged substantially oppositely to each other via charge circuits 504A and 504B, respectively. In some implementations, electrodes 502A and 502B may be charged substantially oppositely about a reference voltage, as described in further detail below with reference to FIG. 10. Electrodes 502A and 502B may each be configured in various suitable manners, including as contiguous pads, metal meshes, a group of two or more electrodes, etc.

Charge circuits 504A and 504B may respectively include voltage sources 506A and 506B configured to provide substantially opposite, fixed voltages (e.g., $+V_{charge}$ and $-V_{charge}$, respectively), and may also respectively include charge switches 508A and 508B for selectively coupling the corresponding voltage source to the corresponding electrode. In the illustrated implementation, the output voltages from voltage sources 506A and 506B may take on only two values corresponding to the on or off status of charge switches 504A and 504B; in other implementations, the output voltages may take on a greater range of values—e.g., to reduce the harmonic content of the output waveforms or to decrease radiated emissions.

FIG. 5 also shows various parasitic capacitors that may be formed with electrodes 502A and 502B during operation of circuit 500, such as $C_{p0}$ (e.g., between an electrode and display device 108 of FIG. 1), $3C_{p1}$ (e.g., between an electrode and three differently charged electrodes arranged one row or column apart), and $2C_{p2}$ (e.g., between an electrode and two differently charged, diagonally adjacent electrodes). Parasitic capacitors $C_{p1}$ and $C_{p2}$ are further illustrated in FIG. 7. Transfer switches 510A and 510B may be respectively provided for electrodes 502A and 502B, and may each be operable to couple the corresponding electrode to a node 512—e.g., to transfer the charge stored on the corresponding electrode to the node. As shown, electrode 502A may thus be coupled to electrode 502B at node 512, where a net charge may form that is a sum of the individual charges stored on the electrodes. Transfer switches 510A and 510B may be configured as two Single Pole Single Throw (SPST) switches, or in other implementations may be combined in one Single Pole Double Throw (SPDT) switch, for the purpose of selectively connecting electrodes 502A and 502B to their corresponding voltage sources or to an integration circuit described below.

FIG. 5 illustrates a hover sensing circuit configuration in which, by coupling electrodes 502A and 502B to each other at node 512 and charging the electrodes substantially oppositely, charges stored in parasitic capacitors (e.g., $C_{p0}$, $C_{p1}$, $C_{p2}$) common to both electrodes can be cancelled. The effect of the parasitic capacitors may thus be compensated, and by cancelling common parasitic charge, the charge stored in the signal capacitor $C_s$—e.g., charge desired for identifying the presence of human hand 104—may remain. In this way, the signal capacitance $C_s$ can be maximized without being saturated by the large offset introduced by the parasitic capacitance $C_p$. Therefore, the SNR and sensing accuracy of hover sensing circuit 500 may be significantly increased. Further, by coupling the outputs of electrodes 502A and 502B to the single node 512, a single capacitance readout circuit may suffice for detecting hover objects over either of the electrodes. Accordingly, the cost, complexity, and transfer of hover data to a controller may be reduced. In contrast, hover sensing circuit 300 (FIG. 3) provides capacitance readout circuitry for each and every electrode.

Hover sensing circuit 500 may include an integration circuit 514 configured to store a net charge on an integration capacitor 516—e.g., the net charge formed at node 512 that is the sum of the individual charges stored on electrodes 502A and 502B. Integration circuit 514 may further include a reset switch 518 and an operational amplifier 520 (e.g., inverting amplifier) arranged in parallel with integration capacitor 516. Reset switch 518 may be operable to selectively discharge integration capacitor 516, and may be closed to discharge the capacitor after a desired number of integration periods such that a cumulative charge may be stored on the capacitor that is a sum of the charges stored on the capacitor after each integration period to integration circuit 514, one or both of the selected parameters may be fed back to other portions of circuit 500 or to other components not shown (e.g., K may be fed back to a component that actuates reset switch 518). To facilitate the adjustable selection of integration capacitance $C_{int}$, integration capacitor 516 may be configured as a variable capacitor, as a bank of switchable capacitors, etc.

Integration circuit 514 may provide an output voltage $V_{int}$ based on (e.g., proportional to) the net charge stored on integration capacitor 516. A sample switch 522 may be operable to couple the output voltage $V_{int}$ of integration circuit 514 to an input of an ADC 524 (e.g., thereby generating a voltage $V_{sample}$), which may be configured to sample the output voltage $V_{int}$ by digitally sampling the voltage $V_{sample}$ (e.g., the voltage at the downstream side of sample switch 522) at its input. ADC 524 may report the digital sample of the output voltage $V_{int}$ to a controller. The controller may indicate the presence of a hover object such as human hand 104 responsive to identifying at least a threshold voltage change based on the digital sample of the output voltage $V_{int}$. Additional detail regarding identification of the threshold voltage change is provided below with reference to FIG. 6.

In many scenarios, the parasitic charges (e.g., non-signal charges) stored on electrodes 502A and 502B may not be completely cancelled, due for example, to manufacturing variations (i.e., defects or differences within a designed tolerance) in the capacitors, electrodes and other electrical components in each branch of the circuit corresponding to electrodes 502A and 502B, variations in temperature of the components that affect their performance, and/or imbalanced charge injection into the electrodes due to variations in the supply voltage or timing of the charge injections, for example. To address the imbalance issue and increase parasitic charge cancellation, circuit 500 may include one or more switchable capacitors 528 in a binary or equally weighted capacitor bank arranged upstream of node 512. The controller (e.g., to which output from ADC 524 is sent) may determine whether to switch each of the one or more switchable capacitors 528 to maximize cancellation of parasitic charges between electrodes 502A and 502B coupled to node 512. Alternatively or additionally, feedback circuit 521 may control the switching of capacitors 528. In some implementations, such imbalance may be mitigated by adjusting the amplitude, frequency, and/or phase of the output of charge circuits 504A and 504B, for example.

Figure 6:
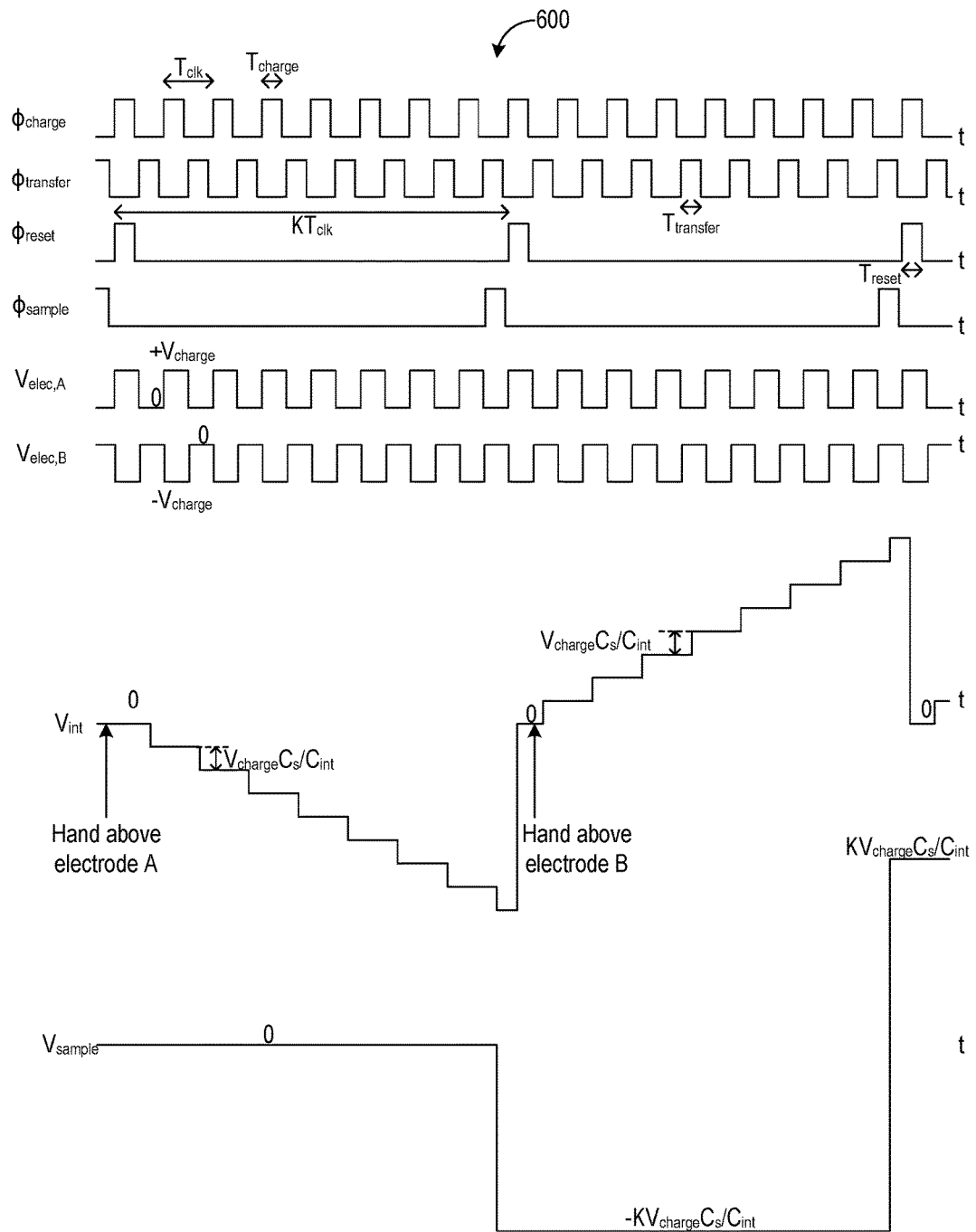
FIG. 6 shows a timing diagram of various operating parameters of the hover sensing circuit of FIG. 5.

FIG. 6 shows a timing diagram 600 of various operating parameters of hover sensing circuit 500. As such, references to FIG. 5 are made hereinafter. In particular, FIG. 6 illustrates clock signals that may be used to actuate charge switches 508A and 508B, transfer switches 510A and 510B, reset switch 518, and sample switch 522, all as a function of time. The clock signals may also represent the current and/or voltage through their corresponding switches as a function of time. FIG. 6 additionally illustrates, as a function of time, the voltage $V_{elec,A}$ on electrode 502A, the voltage $V_{elec,B}$ on electrode 502B, the output voltage $V_{int}$ of integration circuit 514, and the voltage $V_{sample}$ at the input of ADC 524.

During a charge period $T_{charge}$, electrodes 502A and 502B may be respectively coupled to voltage sources 506A and 506B and charged to $+V_{charge}$ and $-V_{charge}$. Consequently, a charge of $\pm V_{charge} C_p$ (if human hand 104 is not present) or a charge of $\pm V_{charge}(C_p+C_s)$ (if the human hand is present) may be stored on each of electrodes 502A and 502B, where $C_p$ is the total parasitic capacitance (e.g., $C_{p0}+3C_{p1}+2C_{p2}$). During a transfer period $T_{transfer}$, the charges stored in the parasitic capacitors formed with electrodes 502A and 502B may be substantially cancelled, as the electrodes are charged substantially equally and oppositely and are coupled at their downstream ends to the common node 512. Conversely, charge stored in a signal capacitor (e.g., charge desired for identifying the presence of human hand 104) may be fed to integration capacitor 516, and $V_{elec,A}$ and $V_{elec,B}$ may both return to zero. Accordingly, the output voltage $V_{int}$ of integration circuit 514 may change by $V_{charge}C_s/C_{int}$, assuming human hand 104 is present. This process may be repeated for K number of integration periods such that a cumulative charge (and/or voltage) is formed on integration capacitor 516 that is a sum of the charges (voltages) stored on the integration capacitor for each integration period. In the example depicted in FIG. 6, the K number of integration periods is 8, and $V_{int}$ reaches a maximum/minimum of $\pm 8V_{charge}C_s/C_{int}$. After the K number of integration periods, ADC 524 may sample the output voltage $V_{int}$ of integration circuit 514 by digitally sampling the voltage $V_{sample}$ (e.g., the voltage at the downstream side of sample switch 522) at its input. ADC 524 may report the digital sample of the output voltage $V_{int}$ to a controller. The controller may indicate the presence of human hand 104 responsive to identifying at least a threshold voltage change based on the digital sample of the output voltage $V_{int}$—e.g., the change in $V_{sample}$ from 0 to $-KV_{charge}C_s/C_{int}$ when the human hand approaches electrode 502A from a distance, the change in $V_{sample}$ from 0 to $+KV_{charge}C_s/C_{int}$ when the human hand approaches electrode 502B from a distance, the change from $-KV_{charge}C_s/C_{int}$ to $+KV_{charge}C_s/C_{int}$ when the human hand moves from electrode 502A to electrode 502B, or the change from $+KV_{charge}C_s/C_{int}$ to $-KV_{charge}C_s/C_{int}$ when the human hand moves from electrode 502B to electrode 502A. Integration capacitor 516 may be discharged to zero during a reset period $T_{reset}$.

FIG. 6 also illustrates how the presence of human hand 104 over electrode 502A can be distinguished from its presence over electrode 502B. With human hand 104 hovering over electrode 502A, $V_{int}$ accumulates a progressively larger negative voltage with each integration period. Conversely, with human hand 104 hovering over electrode 502B, $V_{int}$ accumulates a progressively larger positive voltage with each integration period. Thus, charging electrodes 502A and 502B substantially oppositely may facilitate the distinguishing of hover objects over the electrodes.

If electrodes 502A and 502B were arranged adjacent to each other in an electrode array, and a hover object were hovering above both electrodes and introducing substantially equal signal capacitances to both electrodes, an output voltage $V_{int}$ substantially equal to zero may result, as if the hover object were not present. This may result from the substantially equal and opposite charging of electrodes 502A and 502B, as the introduction of substantially equal signal capacitances to the electrodes may result in the induction of substantially equal and opposite charges on the electrodes which are then substantially cancelled at node 512. Accordingly, an electrode array incorporating circuit 500 may arrange electrodes 502A and 502B in a non-adjacent configuration.

Figure 7:
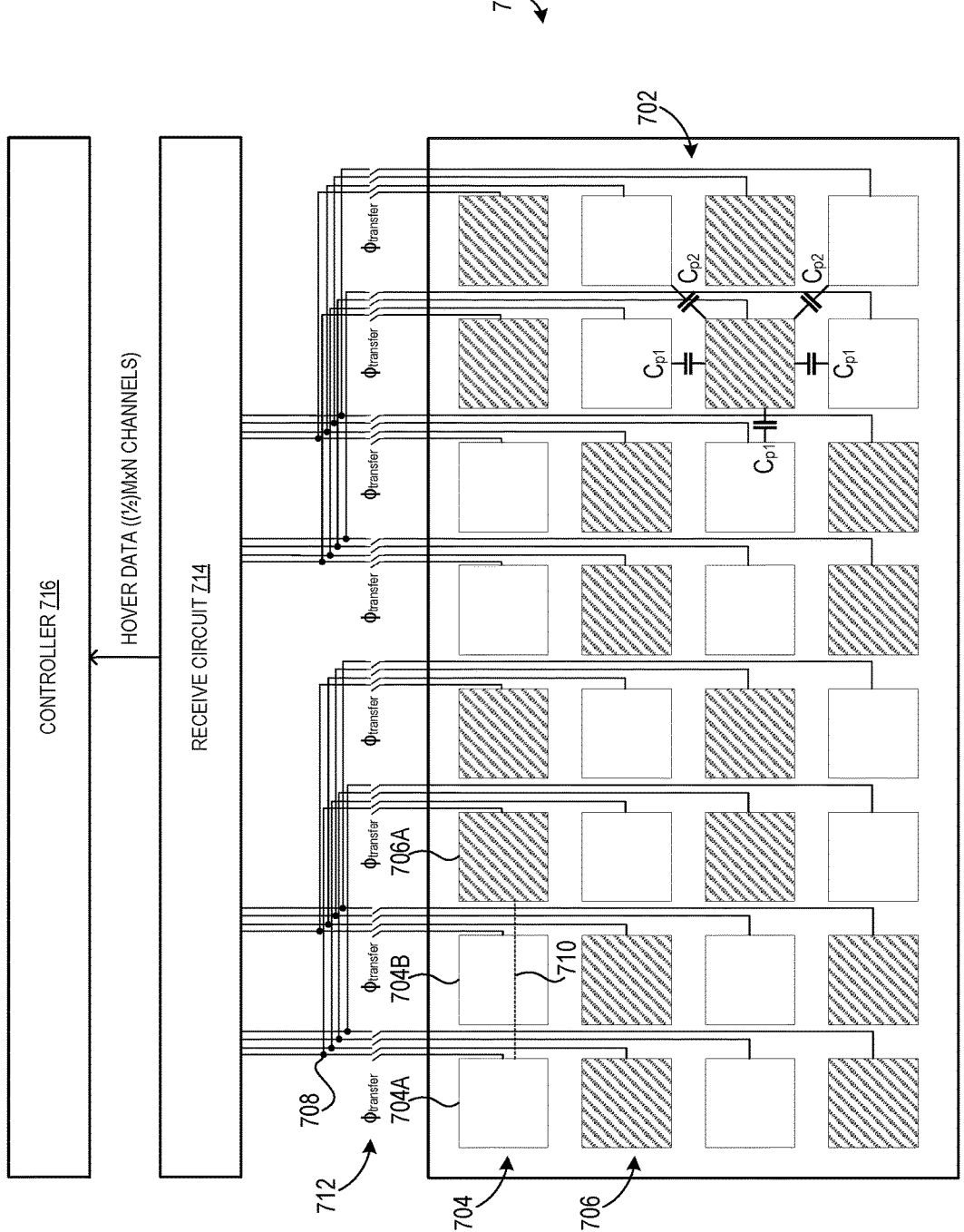
FIG. 7 shows an example hover sensor including an electrode array.

FIG. 7 shows an example hover sensor 700 including an electrode array 702. Electrode array 702 may include a first electrode subset 704 and a second electrode subset 706 (represented in FIG. 7 by shading). A charge circuit (not shown) may be configured to charge first electrode subset 704 substantially oppositely (e.g., to $+V_{charge}$) to second electrode subset 706 (e.g., $-V_{charge}$). Further, each electrode in first electrode subset 704 may be coupled to a corresponding electrode in second electrode subset 706 at a respective node such as node 708. Accordingly, electrode array 702 may incorporate a plurality of hover sensing circuits 500 (FIG. 5), and may be operated in accordance with the manner illustrated by timing diagram 600 (FIG. 6). Electrode array 702 may thus enable the substantial cancellation of parasitic capacitance while enabling measurement of desired signal capacitance as described herein.

In electrode array 702, first electrode subset 704 and second electrode subset 706 may each include two electrodes such that each electrode in the first subset is separated from a corresponding electrode in the second subset (e.g., to which it is coupled at a respective node) by another electrode in one of the first and second subsets. For example, an electrode 704A in the first subset may be coupled to electrode 706A in the second subset at node 708, and electrode 704A may be separated from electrode 706A by an electrode 704B in the first subset. Such a configuration may address the detection issue identified above associated with arranging substantially oppositely charged electrodes (e.g., electrodes 704A and 706A) directly adjacent each other. Instead, a hover object introducing substantially equal signal capacitances to adjacent electrodes can be detected, as the charge induced by the hover object will not be cancelled since the adjacent electrodes are not coupled together at a respective node.

Electrode pairs coupled at a respective node may be separated by a gap substantially corresponding to at least a human hand size range. For example, electrode 704A in first electrode subset 704 may be separated from electrode 706A in second electrode subset 706 by a gap 710 substantially corresponding to at least a human hand size range. The human hand size range may be a range based on an average human hand size range, which may correspond to a range of 5-15 cm or 8-12 cm, for example. The correspondence of gap 710 to the human hand size range may ensure that a human hand (or other hover object) does not introduce substantially equal signal capacitances to electrically coupled electrodes (e.g., 704A and 706A), resulting in the lack of signal detection described above.

FIG. 7 also shows a plurality of transfer switches 712, which may be transfer switches 510 of circuit 500 (FIG. 5), for example, a receive circuit 714, which may implement a remainder of circuit 500 (e.g., by including integration circuits, sample switches, one or more switchable capacitors, and an ADC for each node), and a controller 716 configured to indicate a presence of a hover object responsive to identifying at least a threshold voltage change based on a sample of an output voltage as described above.

Figure 8:
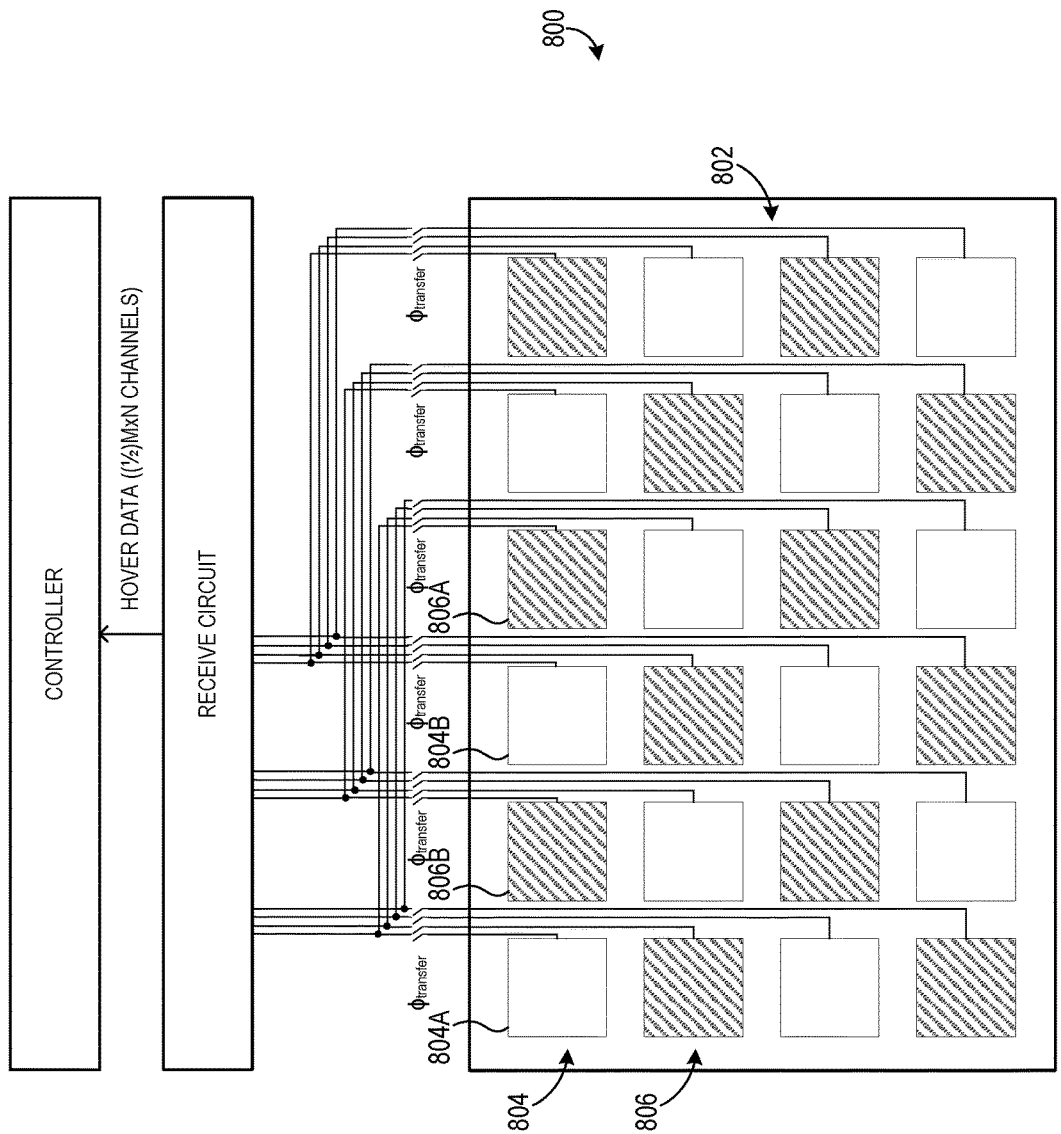
FIG. 8 shows another example hover sensor including an electrode array.

Other electrode array configurations that address the signal detection issue described above are contemplated. FIG. 8 shows an example hover sensor 800 including an electrode array 802 having a first electrode subset 804 and a second electrode subset 806. First and second electrode subsets 804 and 806 may each include a plurality of electrodes, with each electrode (e.g., electrode 804A) in the first subset being separated from a corresponding electrode (e.g., electrode 806A to which it is coupled at a respective node) in the second subset by another electrode (e.g., electrode 804B) in the first subset and another electrode (e.g., electrode 806B) in the second subset.

As another example of an electrode array configuration that addresses the signal detection issue described above, FIG. 9 shows an example hover sensor 900 including an electrode array 902 having a first electrode subset 904 and a second electrode subset 906. First and second electrode subsets 904 and 906 may each include four electrodes, such that each electrode (e.g., electrode 904A) in the first subset is separated from a corresponding electrode (e.g., electrode 906A to which it is coupled at a respective node) in the second subset by three other electrodes (e.g., electrodes 904B, 904C, 904D).

Figure 9:
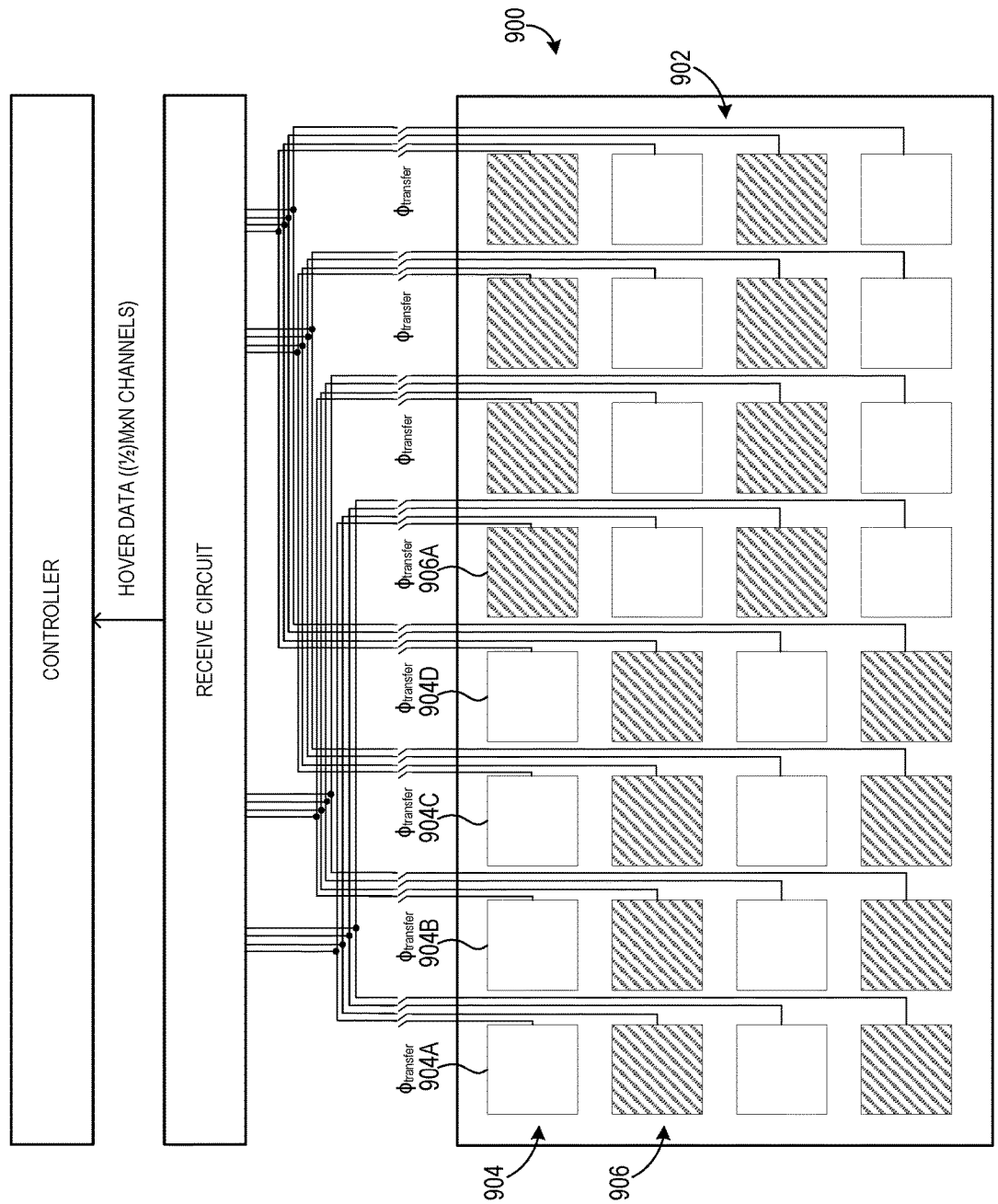
FIG. 9 shows yet another example hover sensor including an electrode array.

While not shown in FIGS. 7-9, the hover sensors (e.g., sensors 700, 800, 900) shown therein may be configured for touch sensing in addition to hover sensing. In one implementation, hover sensor electrodes (e.g., electrode 704A) may be comprised of an array of drive and sense electrodes (e.g., a diamond mesh of drive and sense electrodes, an array of vertically separated rows and columns). The drive electrodes may be driven with a voltage, with the sense electrodes coupled to receive circuitry to sense touch input. Alternatively or additionally, the voltage from drive or sense electrodes to ground may be measured in a self-capacitance configuration to sense touch. In other implementations, a separate touch sensor layer comprising drive and sense electrodes may be provided with the hover sensors—e.g., as a layer adjacent to a layer in which hover sensing electrodes are provided.

Other modifications to the hover sensors and hover sensor operation disclosed herein are possible. For example and with reference to FIG. 5, voltage sources 506A and 506B may alternatively be configured to respectively charge electrodes 502A and 502B to voltages of $V_{ref}+V_{charge}$ and $V_{ref}-V_{charge}$. Electrodes 502A and 502B can thus be charged substantially oppositely about a (e.g., common) reference voltage $V_{ref}$. Such charging may maintain the substantial cancellation of non-signal capacitances described above without requiring that electrodes 502A and 502B be charged equally and oppositely. This approach may be applied to hover sensors (e.g., hover sensors 700, 800, and 900) that implement first and second electrode subsets, such that the first electrode subset is charged substantially oppositely (e.g., to $V_{ref}+V_{charge}$) about a reference voltage to the second electrode subset (e.g., to $V_{ref}-V_{charge}$). The reference voltage $V_{ref}$ may be set to any suitable value, including zero.

Figure 10:
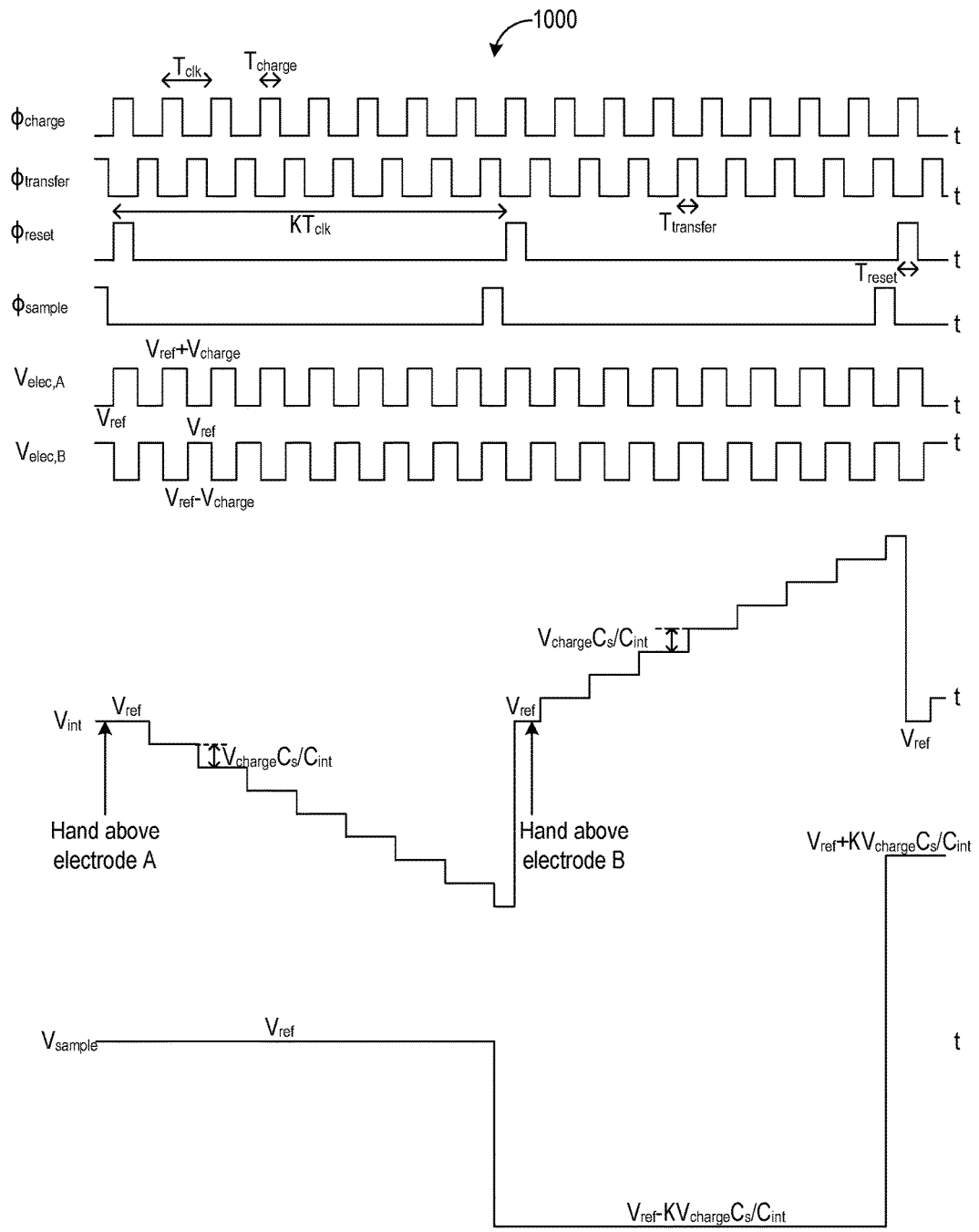
FIG. 10 shows a timing diagram illustrating the substantially opposite charging of electrodes about a reference voltage.

FIG. 10 shows a timing diagram 1000 according to which a hover sensing circuit (e.g., circuit 500 of FIG. 5) may be operated. Like or similar operational aspects of timing diagram 1000 may be understood from timing diagram 600 (FIG. 6) and are not repeated. As shown in FIG. 10, an electrode A may be charged to Vref+Vcharge, while an electrode B may be charged substantially oppositely about the reference voltage to Vref−Vcharge, both according to a charge clock signal. With a human hand above electrode A, an output voltage Vint of an integration circuit may decrease from Vref in steps of VchargeCs/Cint, while, with the human hand above electrode B, the output voltage Vint may increase from Vref in steps of VchargeCs/Cint. After a desired number of integration cycles, a voltage Vsample may be sampled, which may assume a value of Vref−KVchargeCs/Cint with the human hand above electrode A, and a value of Vref+KVchargeCs/Cint with the human hand above electrode B.

Figure 11:
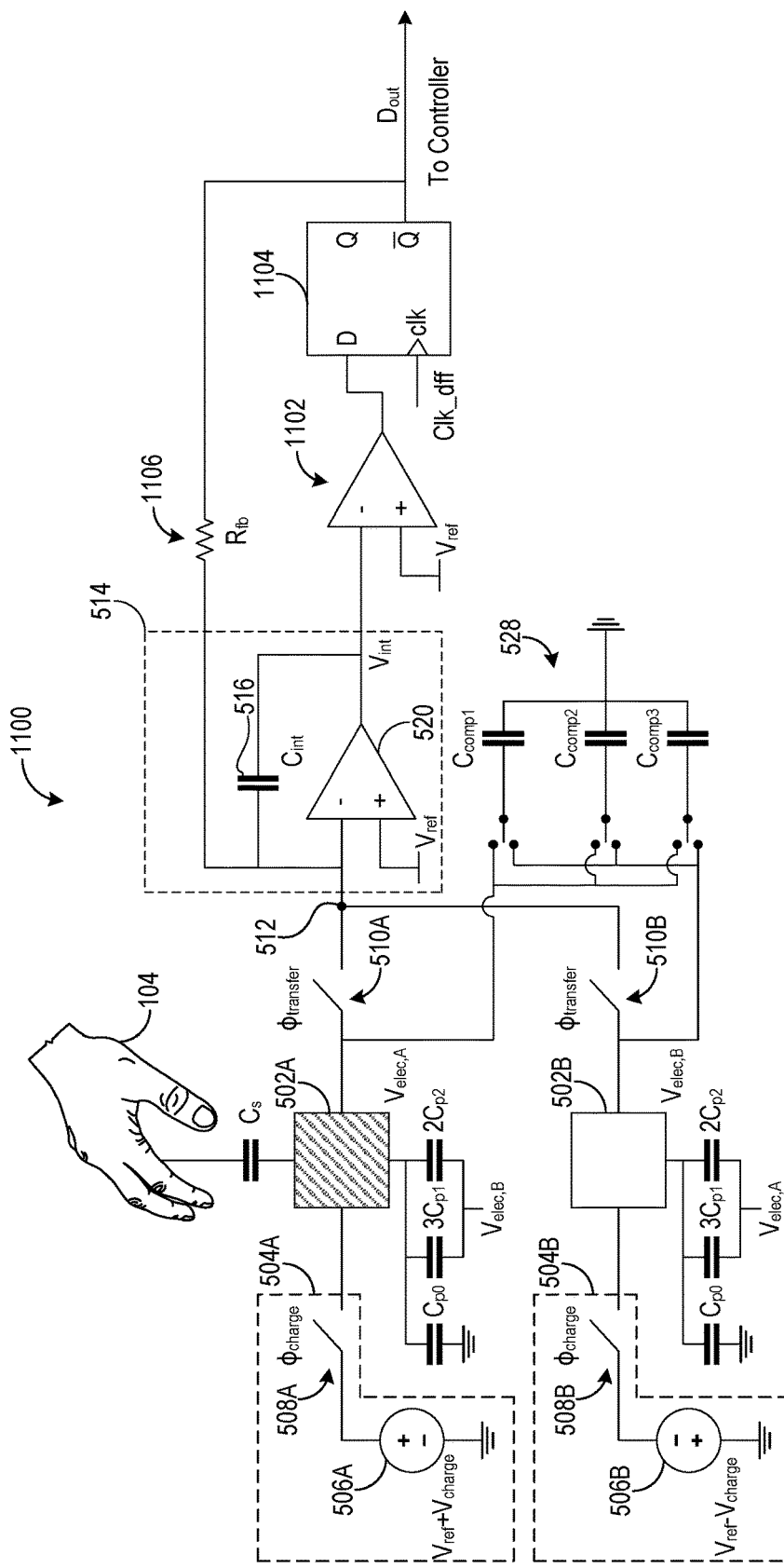
FIG. 11 shows a hover sensing circuit that employs a comparator and flip-flop to sample integration circuit output.

Other approaches to sampling integration circuit output are contemplated. FIG. 11 shows a hover sensing circuit 1100 that employs a comparator 1102 and a D flip-flop 1104 to sample the output of integration circuit 514 for providing digital voltage samples to a controller. As hover sensing circuit 1100 is shown as a modified version of hover sensing circuit 500 (FIG. 5), like or similar aspects of circuit 500 may be understood from FIG. 5 and are not repeated. As shown in FIG. 11, the output voltage $V_{int}$ of integration circuit 514 may be coupled to the negative input of comparator 1102, whose positive input may be coupled to $V_{ref}$. The output of comparator 1102 may be coupled to the D-input of flip-flop 1104, which may also receive a clock signal as input. Flip-flop 1104 may be configured to provide an output Q bar to a controller. FIG. 11 also shows the inclusion of a feedback resistor 1106 coupled to the output of flip-flop 1104 and to the inputs of integration capacitor 516 and operational amplifier 520.

Figure 12:
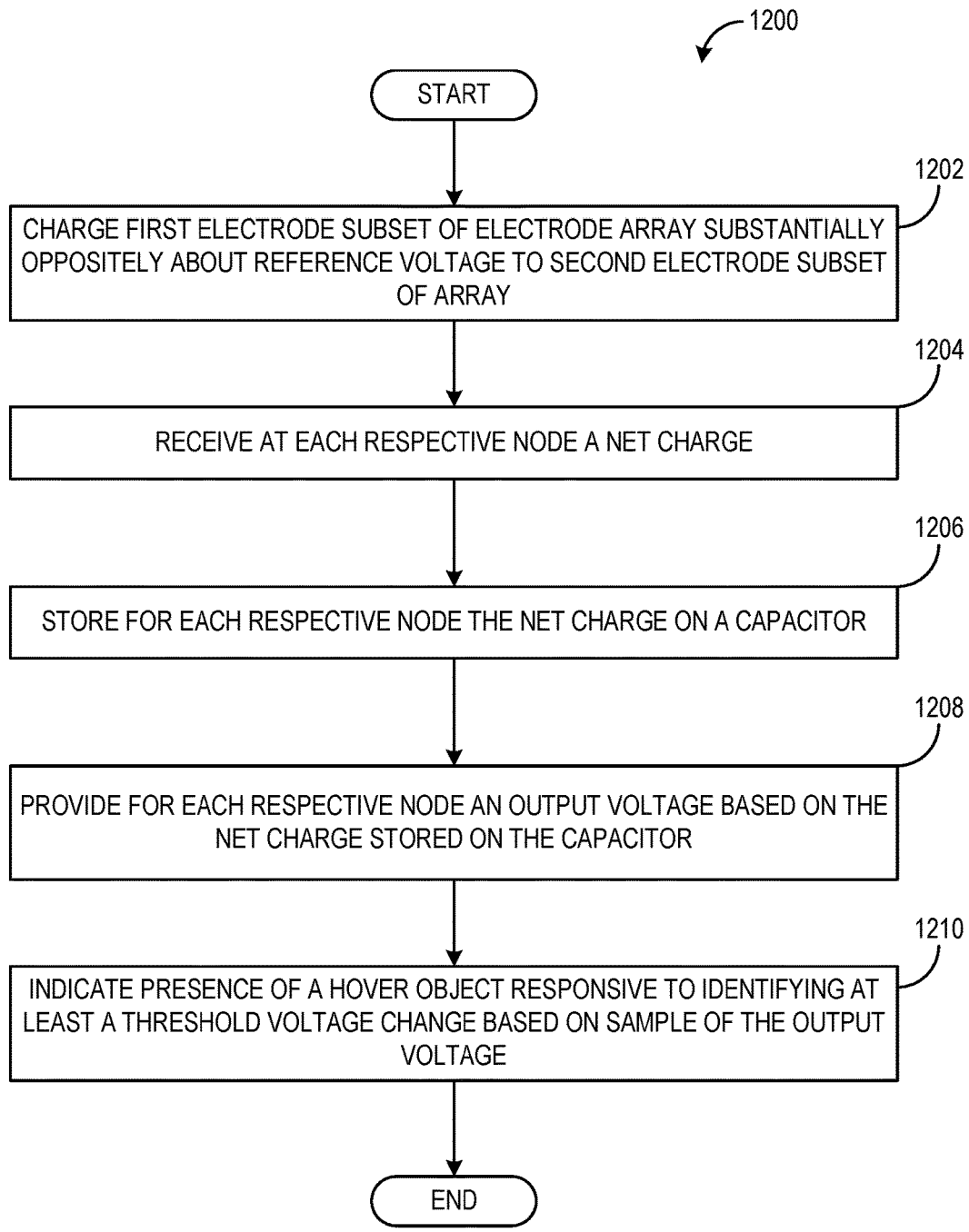
FIG. 12 shows a flowchart illustrating a method of hover sensing.

FIG. 12 shows a flowchart illustrating a method 1200 of hover sensing. Method 1200 may be implemented in one or more of hover sensing circuits 500 (FIG. 5) and 1100 (FIG. 11), in one or more of hover sensors 700 (FIG. 7), 800 (FIG. 8), and 900 (FIG. 9), and/or in accordance with one or more of timing diagrams 600 (FIG. 6) and 1000 (FIG. 10), for example.

At 1202, method 1200 may include charging a first electrode subset of an electrode array substantially oppositely about a reference voltage to a second electrode subset of the electrode array. Each electrode in the first electrode subset may be coupled to a corresponding electrode in the second electrode subset at a respective node, and may be separated from the corresponding electrode by a gap substantially corresponding to at least a human hand size range.

The first and second electrode subsets may respectively correspond to first electrode subset 704 and second electrode subset 706, both of FIG. 7, for example. The first and second electrode subsets may be charged substantially equally and oppositely about the reference voltage by respective charge circuits—e.g., via charge circuit 504A for an electrode in the first subset and via charge circuit 504B for an electrode in the second subset, both of FIG. 5. The reference voltage may assume any suitable value, including but not limited to zero. Analogous charge circuits may be provided for the remaining electrodes in the first and second subsets. Each electrode in the first electrode subset may be coupled to a corresponding electrode in the second electrode subset at a respective node (e.g., node 512 of FIG. 5), where equal and opposite charges may be cancelled (e.g., stored in parasitic capacitors), leaving a net charge (e.g., stored in a signal capacitor) at the node. Each electrode in the first electrode subset may be separated from the corresponding electrode by a gap such as gap 710 (FIG. 7), which may correspond substantially to a range of average human hand widths, for example.

At 1204, method 1200 may include receiving, at each respective node, a net charge. The net charge may be a sum of the individual charges stored on the first and second electrodes coupled to the respective node. As described above, the net charge may be formed at each respective node such as node 512 of FIG. 5. The net charge may be a result of the substantial cancellation of substantially equal and opposite charges stored on the first and second electrodes coupled to the respective node, by virtue of their substantially equal and opposite charging. The net charge that remains may correspond to a signal capacitance resulting from a hovering human hand, for example.

At 1206, method 1200 may include storing, for each respective node, the net charge on a capacitor. The net charge may be stored on, for node 512, integration capacitor 516, both of FIG. 5, for example. Analogous integration capacitors may be provided for each respective node. As described above, net charges may be stored on the capacitor for each of a number of integration periods, with the net charges being accumulated on the capacitor to form a cumulative charge. After the number of integration periods, the cumulative charge may be analyzed (e.g., based on a corresponding voltage) to identify the presence of a hover object. The capacitor may be discharged after the number of integration periods.

At 1208, method 1200 may include providing, for each respective node, an output voltage based on the net charge stored on the capacitor. The output voltage may be an output voltage of an integration circuit such as circuit 514 for node 512, both of FIG. 5, for example. The output voltage $V_{int}$ of integration circuit 514 may result from the net charge stored on integration capacitor 516, for example.

At 1210, method 1200 may include indicating a presence of a hover object responsive to identifying at least a threshold voltage change based on a sample of the output voltage. The sample of the output voltage may be a digital sample collected by an ADC at the input of the ADC. Thus, the sample may be of an input voltage of the ADC, where the input voltage is a voltage across a sample switch to whose input is applied the output voltage of the integration circuit. For example, referring to FIG. 5, ADC 524 may digitally sample its input voltage $V_{sample}$, which is the output voltage of sample switch 522 to whose input is applied the output voltage $V_{int}$ of integration circuit 514. As described above, the threshold voltage change may correspond substantially to $+/-KV_{charge}C_s/C_{int}$, where K is the number of integration periods, $V_{charge}$ is the magnitude of the voltage to which electrodes are charged, $C_s$ is the signal capacitance, and $C_{int}$ is the capacitance of the capacitor. The threshold voltage change may be recognizably greater in magnitude than voltage changes that occur when a hover object is not present or is significantly separated (e.g., outside of a sensing range) from the electrodes. Alternative approaches to sampling integration circuit output are contemplated, such as the use of the sigma-delta converter illustrated in FIG. 11.

The following paragraphs provide additional support for the claims of the subject application. One aspect provides a hover sensor comprising an electrode array including a first electrode subset and a second electrode subset, each electrode in the first electrode subset coupled to a corresponding electrode in the second electrode subset at a respective node and separated from the corresponding electrode by a gap substantially corresponding to at least a human hand size range; a charge circuit configured to charge the first electrode subset substantially oppositely about a reference voltage to the second electrode subset; an integration circuit configured to, for each respective node, store a net charge on a capacitor and provide an output voltage based on the net charge stored on the capacitor; and a controller configured to indicate a presence of a hover object responsive to identifying at least a threshold voltage change based on a sample of the output voltage. In this aspect, the first electrode subset and the second electrode subset alternatively or additionally may each include two electrodes such that each electrode in the first electrode subset is separated from the corresponding electrode in the second electrode subset by another electrode in one of the first and second electrode subsets. In this aspect, the first electrode subset and the second electrode subset alternatively or additionally may each include a plurality of electrodes, each electrode in the first electrode subset separated from the corresponding electrode in the second electrode subset by another electrode in the first electrode subset and another electrode in the second electrode subset. In this aspect, the first electrode subset and the second electrode subset alternatively or additionally may each include four electrodes such that each electrode in the first electrode subset is separated from the corresponding electrode in the second electrode subset by three other electrodes. In this aspect, the hover sensor alternatively or additionally may include, for each respective node, transfer switches operable to couple corresponding electrodes to that respective node. In this aspect, the integration circuit alternatively or additionally may be configured to, for each respective node, receive a net charge for each of a number of integration periods and to store on the capacitor a cumulative charge that is a sum of the net charges received for each of the number of integration periods. In this aspect, the hover sensor alternatively or additionally may include a sample switch operable to couple an output voltage of the integration circuit to an input of an analog-to-digital converter. In this aspect, the analog-to-digital converter alternatively or additionally may be configured to digitally sample the output voltage and provide the sample of the output voltage to the controller. In this aspect, the hover sensor alternatively or additionally may include a reset switch operable to discharge the capacitor. In this aspect, the capacitor may have a capacitance, and the hover sensor alternatively or additionally may further comprise a feedback circuit configured to select the number of integration periods and the capacitance to increase a dynamic range of the integration circuit. In this aspect, the hover sensor alternatively or additionally may comprise, for each respective node, one or more switchable capacitors. In this aspect, for each respective node, the one or more switchable capacitors alternatively or additionally may be arranged upstream of that respective node. In this aspect, the controller alternatively or additionally may be configured to determine whether to switch each of the one or more switchable capacitors to maximize cancellation of parasitic charge between electrodes coupled to that respective node. Any or all of the above-described aspects may be combined in any suitable manner in various implementations.

Another aspect provides a method of hover sensing comprising charging a first electrode subset of an electrode array substantially oppositely about a reference voltage to a second electrode subset of the electrode array, each electrode in the first electrode subset coupled to a corresponding electrode in the second electrode subset at a respective node and separated from the corresponding electrode by a gap substantially corresponding to at least a human hand size range; receiving, at each respective node, a net charge; storing, for each respective node, the net charge on a capacitor; providing, for each respective node, an output voltage based on the net charge stored on the capacitor; and indicating a presence of a hover object responsive to identifying at least a threshold voltage change based on a sample of the output voltage. In this aspect, storing the net charge on the capacitor alternatively or additionally may include receiving a net charge for each of a number of integration periods and storing on the capacitor a cumulative charge that is a sum of the net charges received for each of the number of integration periods. In this aspect, the method alternatively or additionally may comprise coupling an output voltage based on the cumulative charge to an input of an analog-to-digital converter. In this aspect, the method alternatively or additionally may comprise digitally sampling the output voltage at the analog-to-digital converter to derive the sample of the output voltage. Any or all of the above-described aspects may be combined in any suitable manner in various implementations.

Another aspect provides a hover sensor comprising an electrode array including a first electrode subset and a second electrode subset, each electrode in the first electrode subset coupled to a corresponding electrode in the second electrode subset at a respective node; a charge circuit configured to charge the first electrode subset substantially oppositely about a reference voltage to the second electrode subset; an integration circuit configured to, for each respective node, store a net charge on a capacitor and provide an output voltage based on the net charge stored on the capacitor; a feedback circuit configured to select one or more operating parameters of the integration circuit to increase a dynamic range of the integration circuit; and a controller configured to indicate a presence of a hover object responsive to identifying at least a threshold voltage change based on a sample of the output voltage. In this aspect, the one or more operating parameters alternatively or additionally may include a capacitance of the capacitor. In this aspect, the one or more operating parameters alternatively or additionally may include a number of integration cycles. Any or all of the above-described aspects may be combined in any suitable manner in various implementations.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A hover sensor, comprising:
an electrode array including a first electrode subset and a second electrode subset, each electrode in the first electrode subset coupled to a corresponding electrode in the second electrode subset at a respective node and separated from the corresponding electrode by a gap substantially corresponding to at least a human hand size range, each electrode in the electrode array being used to store a corresponding charge via a self-capacitance of that electrode and to receive the corresponding charge;
a charge circuit configured to charge the first electrode subset substantially oppositely about a reference voltage to the second electrode subset;
an integration circuit configured to, for each respective node, store a net charge on a capacitor and provide an output voltage based on the net charge stored on the capacitor; and
a controller configured to indicate a presence of a hover object responsive to identifying at least a threshold voltage change based on a sample of the output voltage.

2. The hover sensor of claim 1, wherein the first electrode subset and the second electrode subset each include two electrodes such that each electrode in the first electrode subset is separated from the corresponding electrode in the second electrode subset by another electrode in one of the first and second electrode subsets.

3. The hover sensor of claim 1, wherein the first electrode subset and the second electrode subset each include a plurality of electrodes, each electrode in the first electrode subset separated from the corresponding electrode in the second electrode subset by another electrode in the first electrode subset and another electrode in the second electrode subset.

4. The hover sensor of claim 1, wherein the first electrode subset and the second electrode subset each include four electrodes such that each electrode in the first electrode subset is separated from the corresponding electrode in the second electrode subset by three other electrodes.

5. The hover sensor of claim 1, further comprising, for each respective node, transfer switches operable to couple corresponding electrodes to that respective node.

6. The hover sensor of claim 1, wherein the integration circuit is configured to, for each respective node, receive a net charge for each of a number of integration periods and to store on the capacitor a cumulative charge that is a sum of the net charges received for each of the number of integration periods.

7. The hover sensor of claim 6, further comprising a sample switch operable to couple the output voltage of the integration circuit to an input of an analog-to-digital converter.

8. The hover sensor of claim 7, wherein the analog-to-digital converter is configured to digitally sample the output voltage and provide the sample of the output voltage to the controller.

9. The hover sensor of claim 6, further comprising a reset switch operable to discharge the capacitor.

10. The hover sensor of claim 6, wherein the capacitor has a capacitance, the hover sensor further comprising a feedback circuit configured to select the number of integration periods and the capacitance to increase a dynamic range of the integration circuit.

11. The hover sensor of claim 1, further comprising, for each respective node, one or more switchable capacitors.

12. The hover sensor of claim 11, wherein, for each respective node, the one or more switchable capacitors are arranged upstream of that respective node.

13. The hover sensor of claim 11, wherein the controller is configured to determine whether to switch each of the one or more switchable capacitors to maximize cancellation of parasitic charge between electrodes coupled to that respective node.

14. A method of hover sensing, comprising:
charging a first electrode subset of an electrode array substantially oppositely about a reference voltage to a second electrode subset of the electrode array, each electrode in the first electrode subset coupled to a corresponding electrode in the second electrode subset at a respective node and separated from the corresponding electrode by a gap substantially corresponding to at least a human hand size range;
receiving, at each respective node, a net charge that is a sum of charges received from a corresponding pair of electrodes, the charges being stored on the corresponding pair of electrodes via a respective self-capacitance of each of the corresponding pair of electrodes;
storing, for each respective node, the net charge on a capacitor;
providing, for each respective node, an output voltage based on the net charge stored on the capacitor; and
indicating a presence of a hover object responsive to identifying at least a threshold voltage change based on a sample of the output voltage.

15. The method of claim 14, wherein storing the net charge on the capacitor includes receiving a net charge for each of a number of integration periods and storing on the capacitor a cumulative charge that is a sum of the net charges received for each of the number of integration periods.

16. The method of claim 15, further comprising coupling the output voltage based on the cumulative charge to an input of an analog-to-digital converter.

17. The method of claim 16, further comprising digitally sampling the output voltage at the analog-to-digital converter to derive the sample of the output voltage.

18. A hover sensor, comprising:
- an electrode array including a first electrode subset and a second electrode subset, each electrode in the first electrode subset coupled to a corresponding electrode in the second electrode subset at a respective node;
- a charge circuit configured to charge the first electrode subset substantially oppositely about a reference voltage to the second electrode subset;
- an integration circuit configured to, for each respective node, store a net charge on a capacitor and provide an output voltage based on the net charge stored on the capacitor;
- a feedback circuit configured to select one or more operating parameters of the integration circuit to increase a dynamic range of the integration circuit; and
- a controller configured to indicate a presence of a hover object responsive to identifying at least a threshold voltage change based on a sample of the output voltage.

19. The hover sensor of claim 18, wherein the one or more operating parameters include a capacitance of the capacitor.

20. The hover sensor of claim 18, wherein the one or more operating parameters include a number of integration cycles.

* * * * *